United States Patent
McMurtry et al.

(10) Patent No.: US 6,802,454 B1
(45) Date of Patent: Oct. 12, 2004

(54) INTERLEAVED SEQUENCING METHOD FOR MULTIPLE TWO-DIMENSIONAL SCANNING CODES

(75) Inventors: David H. McMurtry, San Juan Bautista, CA (US); Scott MacKenzie, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/361,548

(22) Filed: Jul. 27, 1999

(51) Int. Cl.[7] ............................................... G06K 19/06
(52) U.S. Cl. ................... 235/494; 235/462.09
(58) Field of Search ........................... 235/494, 462.01, 235/462.03, 462.07, 462.09, 462.1, 462.13, 454

(56) References Cited

U.S. PATENT DOCUMENTS

| | | | | |
|---|---|---|---|---|
| 3,636,317 A | * | 1/1972 | Torrey | 235/494 |
| 4,493,989 A | * | 1/1985 | Hampson et al. | 235/454 |
| 4,794,239 A | * | 12/1988 | Allais | 235/462.1 |
| 4,822,987 A | * | 4/1989 | Goldenfield et al. | 235/487 |
| 4,924,078 A | * | 5/1990 | Sant'Anselmo et al. | 235/494 |
| 4,978,917 A | * | 12/1990 | Goldenfield et al. | 324/226 |
| 5,032,854 A | * | 7/1991 | Smart et al. | 396/207 |
| 5,216,234 A | * | 6/1993 | Bell | 235/494 |
| 5,304,786 A | * | 4/1994 | Pavlidis et al. | 235/462.07 |
| 5,554,841 A | * | 9/1996 | Kost et al. | 235/494 |
| 5,570,632 A | | 11/1996 | Cumens et al. | |
| 5,619,416 A | * | 4/1997 | Kosarew | 235/375 |
| 5,756,981 A | | 5/1998 | Roustaei et al. | |
| 6,021,283 A | * | 2/2000 | Yoshida | 396/408 |
| 6,199,765 B1 | * | 3/2001 | Uhling | 235/494 |
| 6,527,181 B1 | * | 3/2003 | Kleeberg et al. | 235/462.03 |

* cited by examiner

Primary Examiner—Michael G. Lee
Assistant Examiner—Kumiko C. Koyama
(74) Attorney, Agent, or Firm—Robert B. Martin; Dillon & Yudell, LLP

(57) ABSTRACT

A component has three, two-dimensional arrays that each contain three characters of its nine character, alphanumeric serial number. The first three characters of the serial number must be constant for all parts of this type. As a result, the serial number can be divided among the arrays by using the first character as the first digit in the first array, the second character as the first digit in the second array, and the third character as the first digit in the third array. The remaining characters of the serial number are interleaved in the arrays in the following pattern: the fourth and fifth characters are the second and third digits in the first array, the sixth and seventh characters are the second and third digits in the second array, and the eighth and ninth characters are the second and third digits in the third array.

9 Claims, 1 Drawing Sheet

INTERLEAVED SEQUENCING METHOD FOR MULTIPLE TWO-DIMENSIONAL SCANNING CODES

BACKGROUND OF THE INVENTION

1. Technical Field

This invention relates in general to scanning codes for identifying parts, and in particular to a method for sequencing multiple two-dimensional scanning codes to identify small parts.

2. Background Art

In the manufacturing of disk drives, it is very important to be able to track spindle motors by their serial number. The serial numbers are used to assure that motors and disks are correctly reworked and ultimately assembled into the disk drive correctly. Some disk drives utilize a flexible printed circuit cable upon which a linear, one-dimensional bar code label can be affixed with pressure sensitive adhesive. The labels contain both human-readable and scanner-readable serial number information.

However, some disk drives use leaf spring connectors that mate to connector pads on the motors instead of using flexible cables. These disk drives have very limited surface area upon which a one-dimensional bar code label may be affixed. The only readily available surface area on these disk drives is their ferrofluid cap on top of the motor. In order to have the serial number encoded, a more compact two-dimensional (2-D) "micro-checkerboard" code, such as a "Data Matrix" symbols, is used (see FIG. 1).

Although it is possible to locate the 2-D code and human-readable characters around the cap, it is not advisable to use adhesives to attach a preprinted label to the cap since the cap will rotate at high speeds. Small particles of adhesive could creep out from beneath the labels and fly off into the file. Also, small shards from the label cutting operation could fly off the label and cause contamination failures.

This problem can be overcome by laser etching the 2-D code and human-readable characters onto the cap. This solution can be performed with no contamination exposure. However, with laser etching, the optical contrast and edge sharpness are somewhat lacking compared to conventionally printed labels. This is due to the fact that 2-D codes contain many very small cells, some of which are etched and some of which are left blank. For example, the minimum permissible array size is a 10×10 code array containing 100 cells. However, a 10×10 array can only encode up to three alphanumeric characters. In order to maximize the scanner read reliability, it is important to keep the individual cells of the 2-D code as large as possible. Larger cells are more impervious to slight dents, scratches and raw material surface imperfections, and laser etching imperfections than small cells.

Unfortunately, the serial numbers of some disk drives contain nine alphanumeric characters. It would take a 14×14 array to encode the entire nine characters in a single array, which is prohibitively large in size to fit on small parts. As shown in FIG. 2, one solution is to split the serial number 11 into three array codes 13, 15, 17 of three characters each on the part 19 (i.e. three 10×10 arrays located adjacent to one another). It is noteworthy that, using the same available space, the cells of a 10×10 array are about twice as large as those of a 14×14 array.

At the beginning of the manufacturing operation, the motor is placed onto a conveyor pallet by an operator without regard to angular orientation. The optical scanner for the 2-D codes views the entire motor cap. The scanner algorithm is capable of reading all three arrays independent of their orientation. However, since there is no predictable angular orientation, the scanner is unable to control the scan sequence. The three arrays must be ordered in the correct sequence so that the nine character serial number can be correctly reconstructed. Thus, a method for assuring the correct sequencing of multiple, randomly read array codes is needed.

SUMMARY OF THE INVENTION

A component has three, laser etched, two-dimensional arrays that each contain three characters of its nine character, alphanumeric serial number. In order for this concept to work, the first three characters of the serial number must be constant for all parts of this type. As a result, the serial number can be divided among the arrays by using the first character as the first digit in the first array, the second character as the first digit in the second array, and the third character as the first digit in the third array. The remaining characters of the serial number are interleaved in the arrays in the following pattern: the fourth and fifth characters are the second and third digits in the first array, the sixth and seventh characters are the second and third digits in the second array, and the eighth and ninth characters are the second and third digits in the third array. With this system, the correct sequence for the arrays will always be ascertainable regardless of the order in which they are read.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 3:
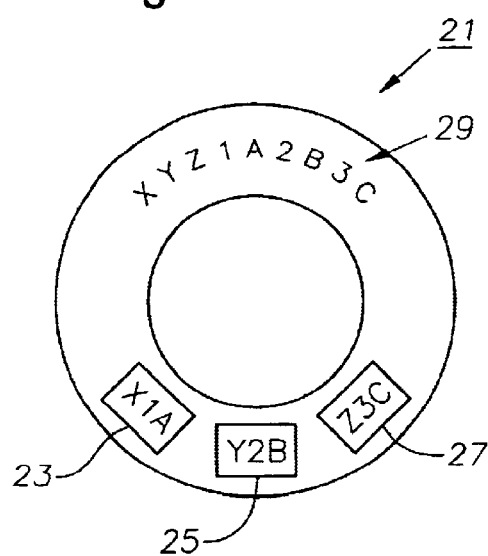
FIG. 3 is a top view of the part of FIG. 1 having a simulated sequence of two-dimensional array codes constructed in accordance with the invention.
Figure 4:
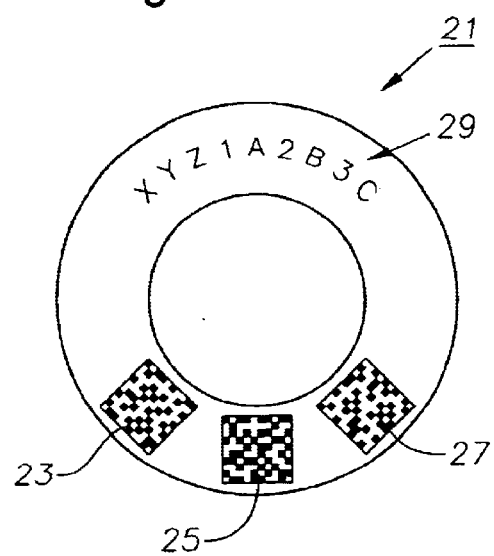
FIG. 4 is an enlarged top view of the part of FIG. 3 having human-readable and machine-readable codes.

Referring to FIGS. 3 and 4, an assembly part such as a motor cap 21 with a central axis and three, laser etched array codes 23, 25, 27 on its upper surface for identifying and encoding the nine character, alphanumeric serial number of cap 21. A human-readable code 29 of the serial number is also etched on cap 21. Note that FIG. 4 depicts a realistic view of cap 21 with human and machine-readable codes, while FIG. 3 is shown for illustration purposes. In the embodiment shown, the array codes 23, 25, 27 are laser etched on cap 21 and substantially equidistant from the axis.

Fortunately, for a given product program having a nine character alphanumeric serial number, the prefix or first three characters are always constant. The remaining characters are completely unique to cap 21. Thus, the first three or "order" characters can be entered into the system by the operator at the beginning of a production run. Note that the order characters may also comprise other prefixes, suffixes, or the like.

Figure 1:
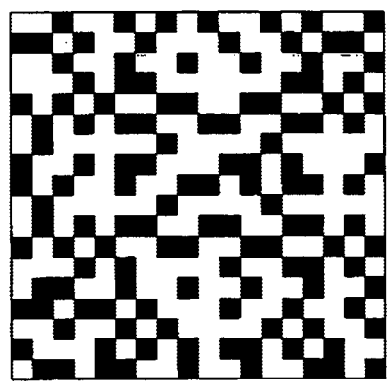
FIG. 1 is an enlarged plan view of two-dimensional, machine-readable code.
Figure 2:
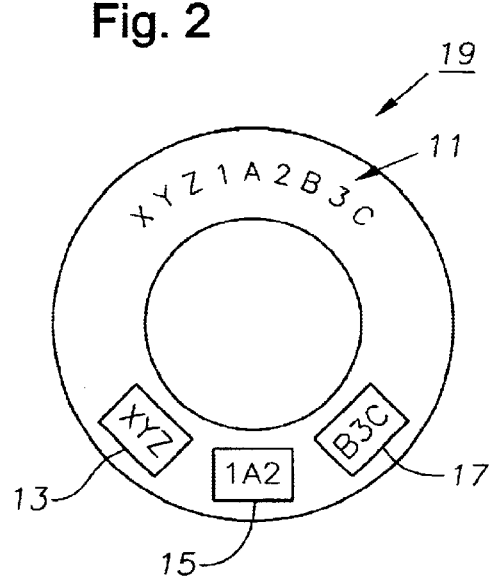
FIG. 2 is a top view of a part having prior art, simulated, multiple two-dimensional array codes.

For example, if a serial number is "XYZ1A2B3C", it would normally be split between arrays as follows: "XYZ", "1A2", and "B3C", respectively (like FIG. 2). However, if the serial number code is interleaved by taking the first three characters and assigning them as the first digit of each of the arrays 23, 25, 27, their correct sequence will always be ascertainable regardless of the order in which they are read. Thus, the serial number would be split between arrays 23, 25, 27 as follows: "X1A", "Y2B", and "Z3C" (FIG. 3). The sequence information is encoded into each array and can be used to reconstruct the correct serial number independent of the scan sequence. Note that in FIGS. 2 and 3, even through the "digits" of the arrays are shown as alphanumeric characters, they would actually be encoded in a machine-readable format (like FIG. 4). After cap 21 is encoded, its codes or arrays 23, 25, 27 are scanned or read by a machine code reader to reconstruct its serial number and verify its accuracy.

The invention has several advantages. This encoding method permits the use of multiple, two-dimensional codes on an unoriented axis-symmetric object with normal scanners which are incapable of determining code sequence. It is desirable to maintain simplicity with the normal serial number sequence which increments the low order digits most often, and the high order digits the least. This concept is useful to maximize the readability of the serial number in the presence of dirt, scratches, and contamination. The serial number is divided amongst a plurality of data matrix codes to maximize the size of the individual cells in each matrix.

While the invention has been shown or described in only some of its forms, it should be apparent to those skilled in the art that it is not so limited, but is susceptible to various changes without departing from the scope of the invention. For example, the order characters, unique characters, and array codes could be greater or fewer in number. In addition, the serial number could be sequenced in any programmable order including forward, backward, odds, evens, etc.

We claim:

1. An apparatus, comprising:

a body having an axis of rotation;

a serial number laser etched on the body, the serial number appearing on the body in a symmetrically arcuate array about the axis in both human-readable and machine readable forms, the serial number having a plurality of order characters and a plurality of unique characters;

a plurality of two dimensional array codes on the body, each encoding a portion of the serial number such that the entire serial number is encoded on the body; wherein a first one of the array codes encodes a first one of the order charters, a second one of the array codes encodes a second one of the order characters, a third one of the array codes encodes a third one of the order characters, and the unique characters are sequentially divided among and encoded by the array codes following said ones of the order characters; and wherein the human-readable form of the serial number appears in a first order, and the machine-readable form of the serial number appears in an order different from the first order.

2. The apparatus of claim 1 wherein each of the array codes comprises a 10×10 array of cells.

3. The apparatus of claim 1 wherein the serial number has three order characters and six unique characters, and wherein there are three array codes on the body, each encoding three, nonsequential characters of the serial number.

4. A method for encoding the serial number of an apparatus, the serial number having a plurality of order characters and a plurality of unique characters, the method comprising:

(a) providing the apparatus with two versions of the serial number: a plurality of separate, machine-readable codes, and a single human-readable code;

(b) encoding one of the order characters of the serial number with each of the machine-readable codes;

(c) dividing and encoding the unique characters of the serial number among the codes following the order characters encoded in step (c), such that an order of the serial number in the machine-readable codes differs from an order of the serial number in the human-readable code; and then reading the machine-readable codes with a machine code reader and reconstructing the machine-read serial number in the same order as the human-read code.

5. The method of claim 4 wherein steps (b) and (c) comprise independently and sequentially dividing the order characters and the unique characters among the codes.

6. The method of claim 4, further comprising the step of laser etching the codes on the apparatus.

7. The method of claim 4 wherein step (a) comprises providing three codes on the apparatus, each encoding three, nonsequential characters of the serial number.

8. A method for encoding the serial number of an apparatus, the serial number having a plurality of order characters and a plurality of unique characters, the method comprising:

(a) providing the apparatus with a plurality of laser etched, machine-readable, two-dimensional array codes, the array codes being symmetrically positioned about a rotational axis of the apparatus such that the array codes are oriented in a arcuate pattern about the axis;

(b) sequentially encoding one of the order characters of the serial number with each of the array codes;

(c) sequentially dividing and encoding the unique characters of the serial number among the array codes following the order characters encoded in step (b);

(d) forming the serial number on the apparatus in a human-readable code that differs in order from an order of the machine-readable array codes; and then (e) reading the array codes with a machine code reader and reconstructing the machine-read serial number in the same order of the human-readable code.

9. The method of claim 8 wherein step (a) comprises providing three codes on the apparatus, each encoding three, nonsequential characters of the serial number.

* * * * *

UNITED STATES PATENT AND TRADEMARK OFFICE
CERTIFICATE OF CORRECTION

PATENT NO. : 6,802,454 B1
DATED : October 12, 2004
INVENTOR(S) : McMurtry et al.

It is certified that error appears in the above-identified patent and that said Letters Patent is hereby corrected as shown below:

Column 4,
Line 23, delete "(c)", and insert -- (b) --.

Signed and Sealed this

Eighteenth Day of October, 2005

JON W. DUDAS
*Director of the United States Patent and Trademark Office*